Oct. 27, 1953 T. K. HOLMEN 2,656,997
BALANCED LOAD HANGER
Filed Jan. 31, 1951

INVENTOR.
Thorleif K. Holmen
BY *M. Bjorndal*
Atty.

Patented Oct. 27, 1953

2,656,997

UNITED STATES PATENT OFFICE 2,656,997

BALANCED LOAD HANGER

Thorleif K. Holmen, Brooklyn, N. Y.

Application January 31, 1951, Serial No. 208,801

2 Claims. (Cl. 248—54)

This invention relates to a new and improved balanced load hanger for furnishing spring support for pipe and other heavy objects subject to motion and specifically it refers to a balanced load hanger of a simpler and more easily adjustable type, where the necessary spring tension may be calculated in advance for a given load and where only a slight adjustment is necessary.

An important object of the present invention, is to furnish a balanced load hanger in which the spring can be pre-calculated for a given load, so as to require only a slight additional adjustment at the time of erection.

Another object of this invention, is to provide a balanced load hanger of simple construction, that can be manufactured at low cost and having a simple adjusting mechanism which permits adjustment of the spring inside of the necessary range, by simple means.

Other objects and advantages of my invention will be apparent during the course of the following description.

Figure 1:
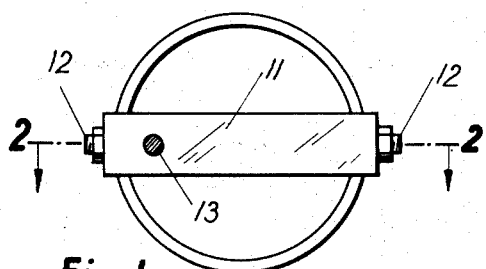
Figure 3:
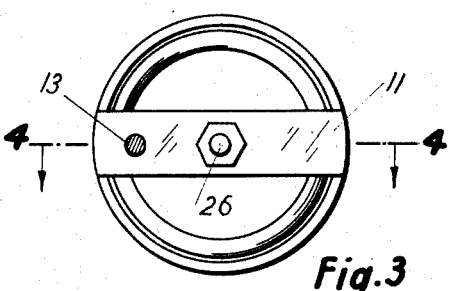
Figure 2:
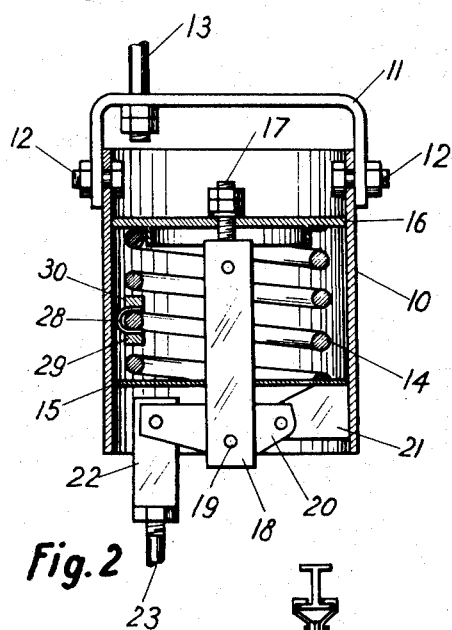
Figure 4:
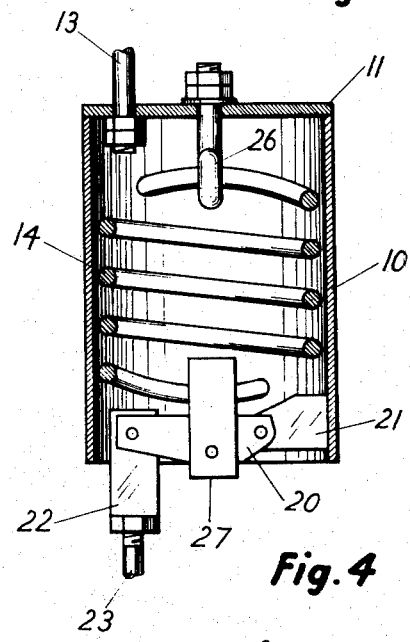
Figure 5:
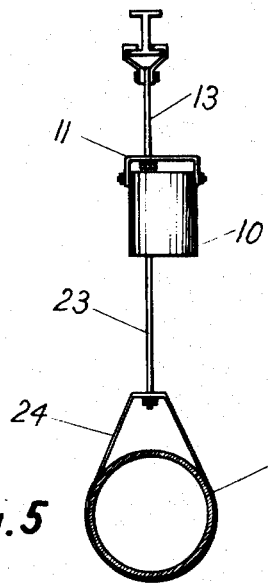
Figure 6:
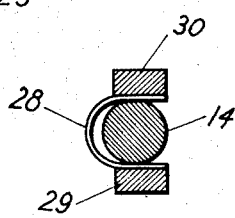

In the accompanying drawing, forming a part of this specification, and in which like numerals designate like parts throughout the same, Figure 1 represents a plan view of a balanced load hanger embodying my invention, Figure 2 represents a section taken along line 2—2 in Figure 1, Figure 3 represents a plan view of a somewhat different embodiment of my invention, Figure 4 represents a section taken along line 4—4 in Figure 3, Figure 5 represents a schematic diagram of the balanced load hanger supporting a pipe, and Figure 6 represents an enlarged view of the adjusting means used to adjust the tension of the spring.

In the drawings, where for the purpose of illustration, are shown two similar preferred embodiments of my invention, the numeral 10 designates the outer housing, which is preferably made from steel pipe. The housing 10 is supported by a strap 11, which as illustrated in Figures 1 and 2, consist of a U-shaped piece of flat steel, same fastened at both ends by means of bolts 12, and being supported from a suitable high beam or other structure by the bolt 13 as shown in Figure 5. The bolt 13 is placed at a suitable off centered position in relation to pipe 10 as will hereinafter be described.

Referring now to Figure 2, inside pipe 10, there is a heavy coil spring 14 which rests upon the ring 15, which is preferably welded into the housing 10. The lower end of the spring is thus solidly supported upon ring 15, and cannot move. The upper end of the spring 14, is free to move and carries to washer 16. A bolt 17 is supported centrally in the washer 16 and carries the link 18, which is pivoted at 19 to the lever 20. The one end of the lever 20, is pivoted to the bracket 21, which is anent to the housing 10. The other end of the lever 20, is pivoted to a link 22, which supports the load carrying bolts 23. The lower end of the bolt 23, carries a suitable strap 24, which supports the pipe 25, see Figure 5.

The balanced load hanger illustrated in Figures 3 and 4, is very similar to the one illustrated in Figures 1 and 2, except that the spring 14 is of a different type and is under tension while the spring in Figure 2 is under compression. In the species shown in Figures 3 and 4, the strap 11, is a flat piece of steel, welded directly across the top of the housing 10. A bolt 26, located in the center of the strap 11, supports the upper end of the spring 14 and the lower end of the spring is pumped into a link 27, which is pivoted to lever 20, similarly as previously described. As mentioned, the only significant difference in the species, illustrated in Figures 3 and 4, is the fact that the spring 14 is under tension rather than compression. The function is otherwise the same.

In Figure 6, is illustrated in enlarged scale a little device, whereby the spring may be adjusted to get the exact tension desired. This device consists of a spring member 28, of thin metal, upon which are fastened two metal pieces 29 and 30. This assembly is placed around the wire of the spring 14, preferably from the outside as shown in Figure 2, and by sliding this assembly along the wire until it is in the proper position, the spring 14 may be effectively shortened or lengthened until it is giving the correct tension. When the spring 14, is compressed, the individual turns of same move closer together and when therefore, the metal pieces 29 and 30 are interposed between the turns, these will come together sooner and will prevent further compression. It can be demonstrated by calculation that this is the same in effect, as if the spring had been cut shorter and as a result it will give a different tension. It is obvious that this particular method is only usable in the compression spring, but a similar arrangement in which a U clamp spans two turns of the spring, can also be used for a tension spring. This later form is not illustrated, because it is obvious to one skilled in the art.

The operation is as follows: In any given application the load to be carried is usually determined in advance with considerable accuracy. It is also usually possible to determine the amount of motion in the vertical direction. With this data at hand, it is possible to calculate by known mathematical formulas the required tensions and moment of the spring inside of the range of movement desired. After the tension required has been calculated, a spring is made to these specifications and the hanger is installed. If after installing the hanger, it is necessary to make a slight adjustment, this is accomplished by moving the spring clip illustrated in Figure 6, as described above. By placing the metal parts 29 and 30 between the windings of the spring, the spring will become shorter and will change its tension accordingly. Due to the simple and efficient construction of the present hanger however, very little adjustment is required. The simple construction with the rods 13 and 23 in line and with the spring 14 acting as a counterweight, greatly simplifies the statical system involved. It is thus possible to make the springs of a more advantageous size and the entire assembly becomes more compact and of greater utility.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a balanced load hanger of the character described the combination of a cylindrical housing; a U-formed strap fastened with both ends at one end of said housing; a supporting bolt fastened to said strap at a point off center from said cylindrical housing; a cylindrical helical spring supported with its lower end in said cylindrical housing; a cylindrical washer resting upon the upper free end of said cylindrical helical spring; a bolt being placed in the center of said washer; a link being supported by said bolt; a lever pivotal with one end in the lower portion of said cylindrical housing below said spring; a second link being pivotal to the free end of said lever, and a hanger bolt being fastened to said second link.

2. A balanced load hanger of the character described comprising a cylindrical housing having normally its axis in a perpendicular position, said housing having near its lower end, and inside same, an integral ring fastened horizontally in same; a cylindrical helical spring resting with its lower end on said ring and being concentric with said housing; a cylindrical washer being placed upon the free upper end of said helical spring; a link being hung from the centre of said washer parallel to the axis of said spring; a lever pivoted at one end to the lower part of said housing at a point below said ring; a lower supporting rod being pivotal to the other end of said spring, and an upper supporting rod being pivotally fastened to the upper part of said housing at a position coaxial with said lower supporting rod.

THORLEIF K. HOLMEN.

References Cited in the file of this patent

UNITED STATES PATENTS

| Number | Name | Date |
|---|---|---|
| 1,252,397 | Carter | Jan. 8, 1918 |
| 2,145,704 | Wood | Jan. 31, 1939 |
| 2,159,870 | Wert | May 23, 1939 |
| 2,230,340 | Shreffler | Feb. 4, 1941 |
| 2,352,136 | Ten Eyck | June 20, 1944 |